United States Patent [19]
Brown

[11] Patent Number: 5,794,714
[45] Date of Patent: Aug. 18, 1998

[54] FINISH DIRT SCRAPER

[76] Inventor: Dennis Brown, 12070 Kimber La., Dexter, Mo. 63841

[21] Appl. No.: 840,405

[22] Filed: Apr. 29, 1997

[51] Int. Cl.$^6$ .................................................. A01B 49/02
[52] U.S. Cl. ............... 172/799.5; 172/142; 172/196; 172/197; 172/198; 172/200; 172/485; 172/643; 172/668; 172/684.5; 172/708; 172/744; 37/404; 37/407; 37/903
[58] Field of Search ................................ 172/200, 199, 172/197, 142, 785, 684.5, 780, 781, 784, 783, 795, 799.5, 196, 485, 486, 487, 643, 668, 675, 705, 707, 708, 719, 744; 37/412–414, 404, 407, 415, 381, 903

[56] References Cited

U.S. PATENT DOCUMENTS

| | | | |
|---|---|---|---|
| 347,098 | 8/1886 | Evison | 172/200 X |
| 615,284 | 12/1898 | Kountz | 172/200 |
| 621,584 | 2/1899 | Reeds | 172/200 |
| 1,368,585 | 2/1921 | Vigil | 172/199 X |
| 2,619,748 | 12/1952 | McIntosh | |
| 3,628,265 | 12/1971 | Galis | |
| 3,889,404 | 6/1975 | Eftefield | |
| 3,889,405 | 6/1975 | Ranini | |
| 4,127,949 | 12/1978 | Sabrowsky et al. | 172/199 X |
| 4,212,254 | 7/1980 | Zumbahlen | 712/200 X |
| 4,307,522 | 12/1981 | Colville | |
| 4,371,307 | 2/1983 | Mattson | |
| 4,490,929 | 1/1985 | Lucas | |
| 4,704,812 | 11/1987 | Paramore, Jr. | |
| 5,407,014 | 4/1995 | Tranmer | 172/200 X |
| 5,407,015 | 4/1995 | Swords et al. | 172/200 |

FOREIGN PATENT DOCUMENTS

| | | | |
|---|---|---|---|
| 2421539 | 12/1979 | France | 172/199 |
| 3504684 | 8/1986 | Germany | 172/199 |

*Primary Examiner*—Michael J. Carone
*Assistant Examiner*—Christopher J. Novosad
*Attorney, Agent, or Firm*—Haverstock, Garrett and Roberts

[57] ABSTRACT

This invention relates to a dirt leveling device adapted for towing by a tractor which is characterized by one or more chisels attached to a transverse shaft on the front of the dirt leveling device having a rotatable relationship thereto, and a dirt leveling blade rotatably attached to the frame and controlled by a second hydraulically actuated ylinder. The hydraulically actuated cylinder for the chisels and the hydraulically actuated cylinder for the blade may be controlled by extensions to the vicinity of the driver of the towing vehicle.

7 Claims, 5 Drawing Sheets

FINISH DIRT SCRAPER

FIELD OF THE INVENTION

This invention relates to an improved finish dirt scraper and it is particularly concerned with a construction having a series of spring loaded chisels in front of a conventional finish scraper blade, both the chisels and the blade being independently controlled to work in harmony to level uneven surfaces.

BACKGROUND OF THE INVENTION

Finish scrapers to be used in land leveling operations are known in the art. For example, U.S. Pat. No. 4,704,812 discloses an earth mover with a fixed blade. Also, U.S. Pat. No. 3,889,404 discloses a scraper with a hoeing apron attached thereto. U.S. Pat. No. 4,490,929 discloses a grading apparatus having a cutter blade fixed to an earth collecting bucket. In addition, U.S. Pat. No. 4,307,522 discloses a land grading machine having a scraper blade for engaging the ground surface.

None of these references or any other known device is adapted to ground leveling wherein uneven terrain is partially leveled and large clumps of dirt are broken up in advance of a leveling blade. These problems are overcome by the present invention as described hereinafter in greater detail.

SUMMARY OF THE INVENTION

This invention is an improved finish dirt scraper device characterized by a series of spring loaded chisels in front of a leveling blade wherein the chisels and the leveling blade are hydraulically actuated, but adapted to work in harmony to make dirt leveling much more efficient and much faster than any known or disclosed ground leveling machine.

The series of spring loaded chisels is actuated and the depth of cutting controlled by a hydraulically activated cylinder which in turn is controlled by the operator that usually sits on the tow tractor. The chisels help in leveling the surface being traversed as the chisels break large chunks into smaller particles for easier leveling by the leveling blade. Also, since the chisels are spring loaded, smaller rocks may be unearthed which prevents damaging the leveling blade when such rocks are hit while embedded in the earth. Also, when large rocks are encountered, one or more chisels will kick up from their normal position and enable the operator to stop or raise the blade to avoid damaging the land leveling blade.

The multiplicity of chisels are spring actuated and attached to a central shaft which runs transverse of the main frame of the improved finish scraper device of this invention. The chisels, which also may be referred to as knives, generally have a spade shoe attached to the end which can be removed and replaced when damaged or worn. Alternatively, this invention works very well without spade shoes attached to the shanks of the chisels.

Each chisel unit is comprised of means for attaching to a central bar, a shaft adapted to dig into the earth, a spade shoe attached to the end of the shaft and adapted to operate through a spring loaded swivel built into the attachment device. The number of spring loaded chisels on each dirt leveling unit will depend on the size of the equipment, which is generally quite massive. Each chisel unit will be about nine to nineteen inches from a neighboring chisel. Spring loaded chisels particularly useful in the practice of this invention are identified as standard anhydrous applicator shanks, KSC 91, 1¼ inches in line coil spring shank knives marketed by Fertilizer Dealer Supply Company, Boonville, Mo.

The plurality of chisels are raised and lowered by a hydraulic system which works between a flange attached to the transverse bar and the tongue of the land leveling device of this invention. Generally, one hydraulic control device is adequate. However, on very large units, it might be useful to utilize two or more hydraulic control units.

Trailing behind the multiple chisel unit is a land leveling blade adapted to move particles of dirt into a level plane. The dirt leveling blade will be attached to the frame of the device of this invention in a manner adapted to be rotated up and down to accommodate the conditions encountered and the type of dirt being moved about. The land leveling blade is not adapted to function as a bucket for picking up dirt and other matter, although some such materials may build up in front of the land leveling blade when the land leveling apparatus is moved rapidly across the surface of a plat being leveled.

The land leveling blade, being hingedly or pivotally attached to the frame on each side, may be raised and lowered by means of a hydraulically activated cylinder. The hydraulically activated cylinder operates between attachment to a vertical frame member and a transverse member attached to the rear of the land leveling blade so that the land leveling blade may be lowered and simultaneously rotated slightly as it pivots on the rotatable connections on each side of the frame of the device. The vertical frame member projecting upward from the main frame to which one end of the hydraulically activated cylinder is attached, is extended upward for several feet to be substantially higher than the top of the land leveling blade unit. The improved ground leveling device of this invention may be operated with unitary complimentary hydraulic controls which control the depth of the chisels and the position of the leveling blade. Hydraulic pistons useful in this invention are standard #2500, 4×8 cylinder pistons marketed by Cross Manufacturing Company, Lewis, Kans.

DESCRIPTION OF THE PREFERRED EMBODIMENTS OF THE INVENTION

Figure 1:
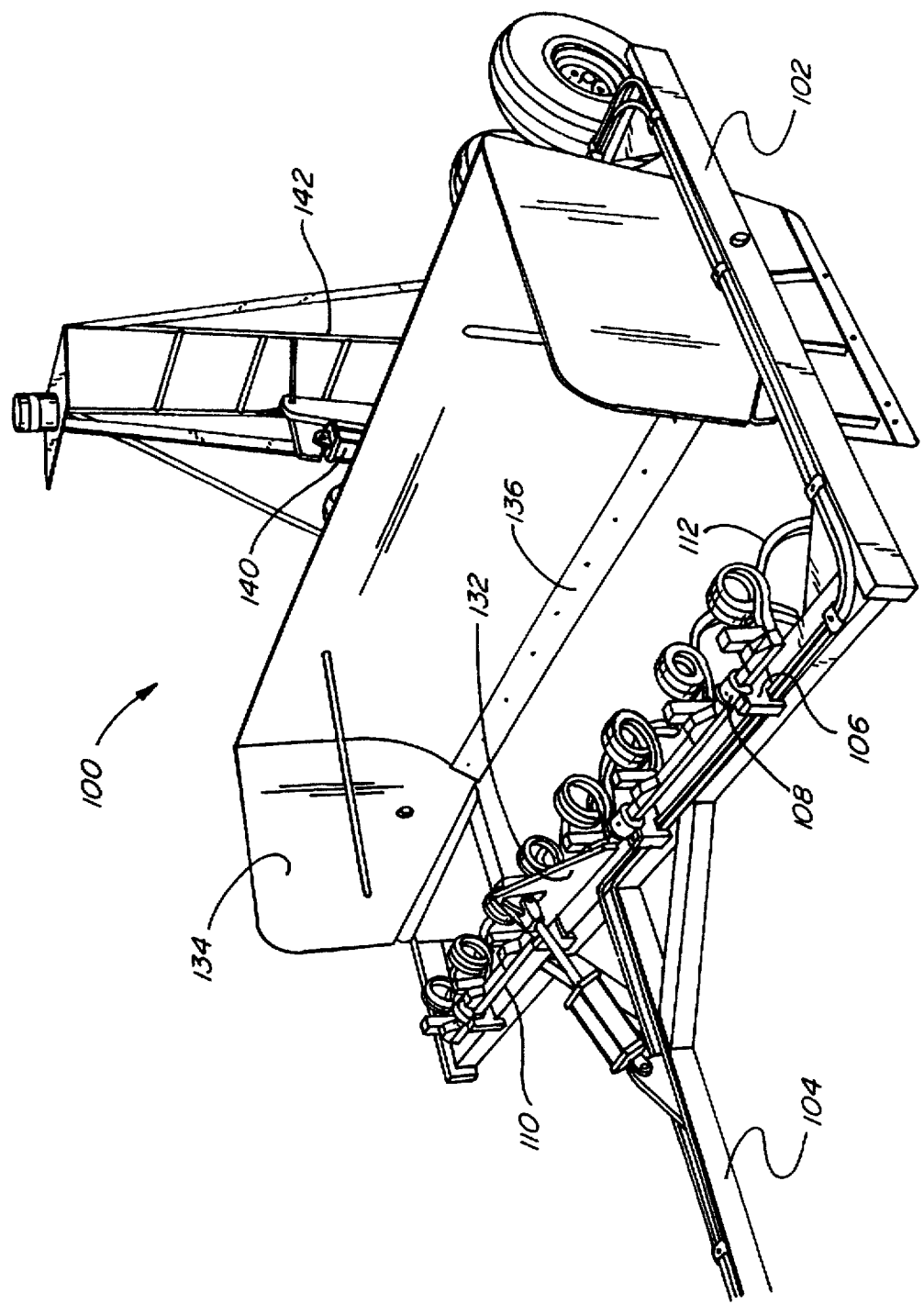
FIG. 1 is a perspective view of the preferred embodiment of this invention.
Figure 2:
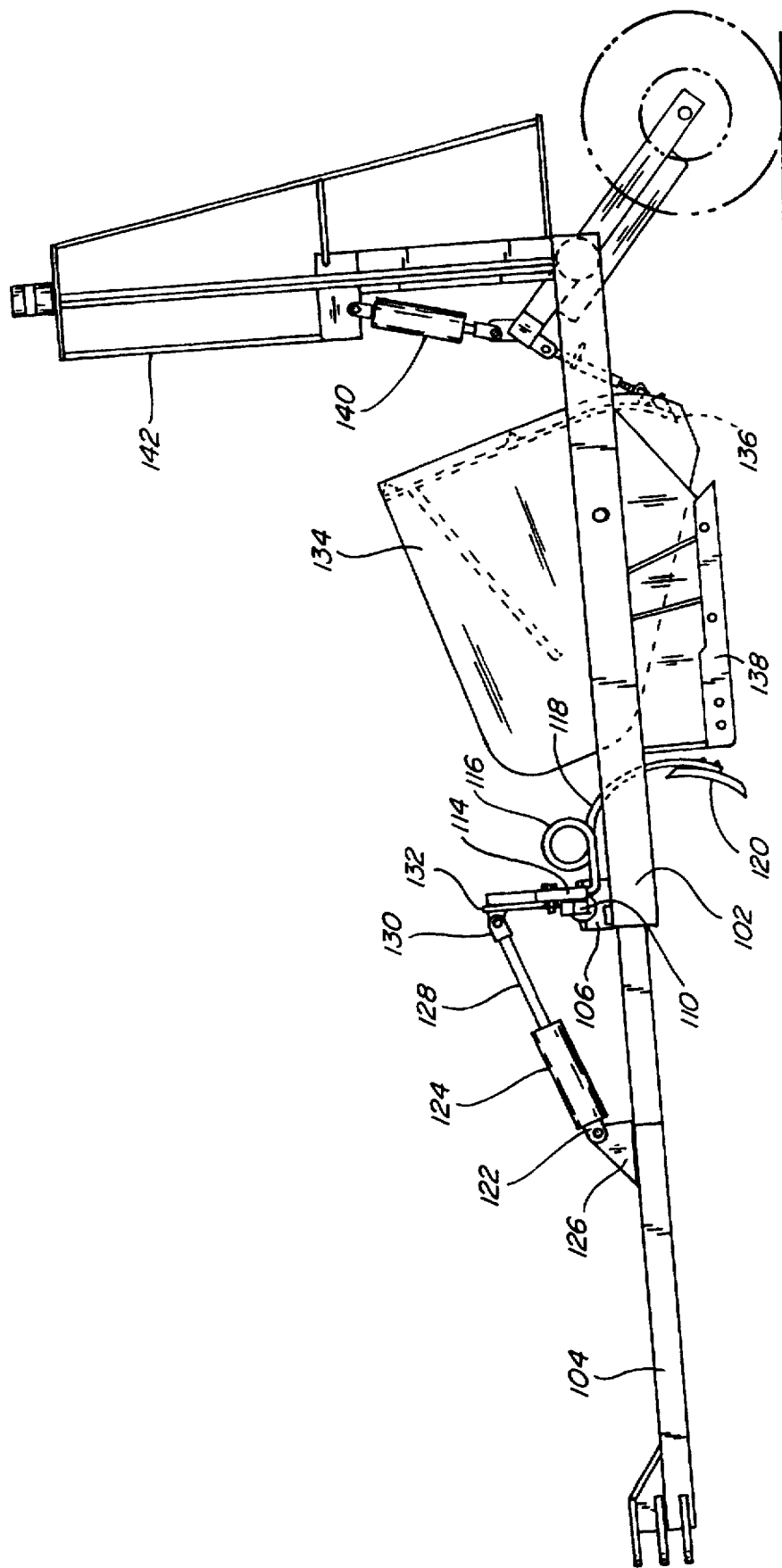
FIG. 2 is a side elevation of this invention.

With reference to the drawings, like numbers will be used to describe like parts in FIGS. 1–5. Referring now to FIG. 1 wherein a preferred embodiment of the present invention for a dirt scraper and leveling device 100 is shown having a frame 102 to which various components of the device 100 are attached along with a towing bar or tongue member 104 with means for hooking the device to a vehicle. One or more mounts 106 having a rotatable port 108 through which a central shaft or transverse member 110 is positioned, are attached to the front edge of the frame 102. One or more spring loaded chisels 112 are mounted along the length of the central shaft 110 and are designed to loosen and break up the ground surface over which the device 100 is pulled. FIG. 2 shows a side view of the chisels 112 having an upper portion 114 attached to the central shaft 110, an adjacent coiled spring portion 116, a downwardly extending curved section 118, and a shoe portion 120 with a spade-shaped blade attached to the lower end of the curved section 118.

Figure 3:
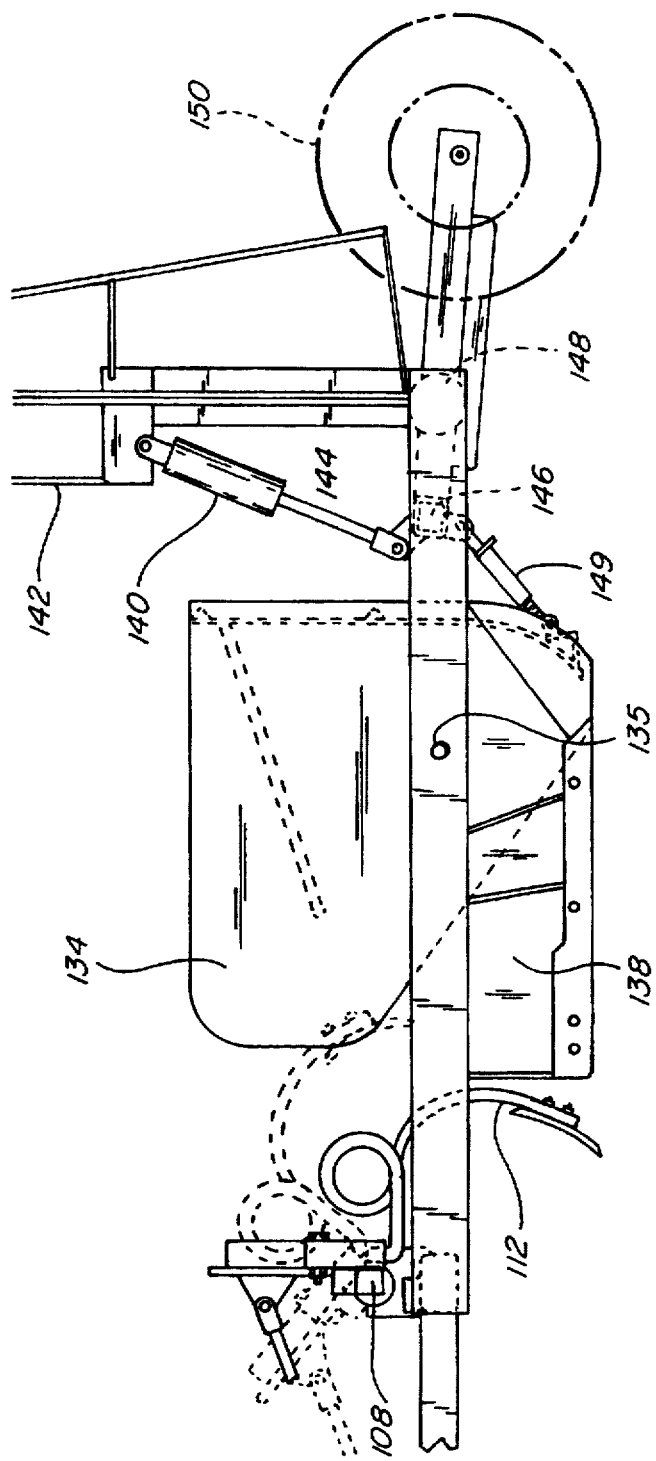
FIG. 3 is a partial side elevation showing the land leveling blade in a lowered position and the chisels in a lowered position.

The present device includes a hydraulic system for lowering the chisels 112 into the surface to be plowed, and for raising them when the device is towed over a surface that does not require plowing. The base end 122 of a hydraulically actuated cylinder 124 is attached to a flange 126 on the towing bar 104. The other end of the hydraulically activated cylinder 124 includes an extending and retracting arm member 128 that is attached to a flange 130 near the vertex of a triangular plate member 132. The base of the triangular plate member 132 is attached to the central shaft 110. During operation, movement of the arm member 128 back and forth causes rotation of the triangular plate member 132 and, therefore, rotation of the central shaft 110. As the central shaft 110 rotates, the chisels 112 are raised or lowered, depending on the direction of rotation as shown in FIG. 3. This construction allows the operator to lower the chisels 112 to plow desired portions of the surface, and to raise the chisels 112 when the device 100 is towed over areas that do not require plowing.

FIG. 3 shows another main component of the present invention, namely, a scoop 134 that is pivotally attached to the frame 102 at an attachment point 135 between the front and rear portions of the frame 102. The scoop 134 has left, right, and rear side walls extending upwardly from the ground that assist in evenly distributing the surface material. The side walls may also aid in carrying along material that can not be broken up by the chisels 112 and which do not fit under the scoop 134 such as rocks. A leveling blade 136 is attached to the lower portion of the rear wall of the scoop 134 to smooth the surface and scrape larger pieces of material along in the scoop 134. This blade is preferably made from highly durable materials that can withstand collision with embedded rocks or other materials. Side guards 138 are attached to the frame 102 adjacent the left and right sides of the scoop 134 to prevent any accumulated material from flowing unevenly out of the scoop as it is towed over the surface.

Figure 4:
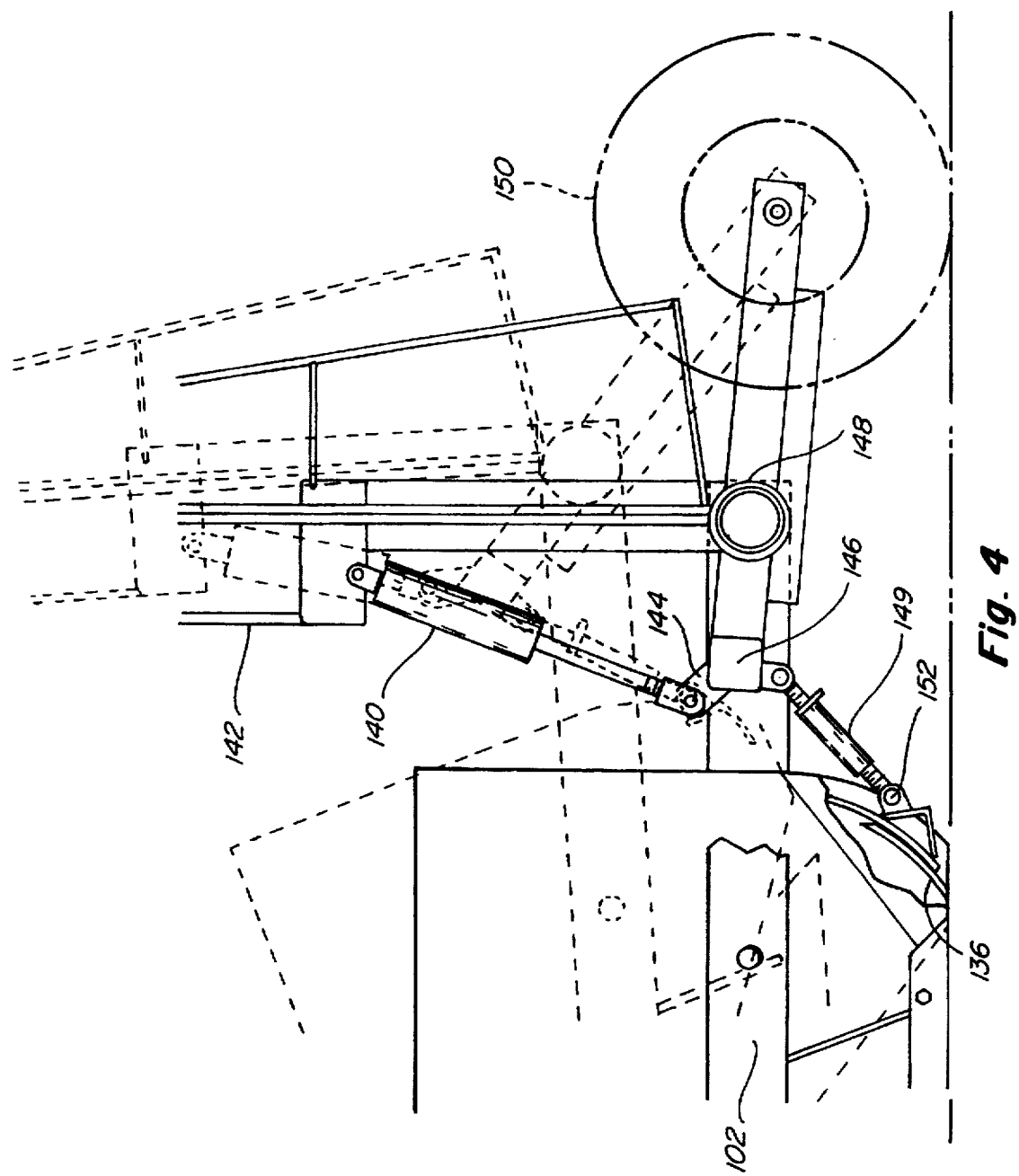
FIG. 4 is a partial side elevation showing the load leveling blade in a lowered position but with phantom lines showing the raised position.
Figure 5:
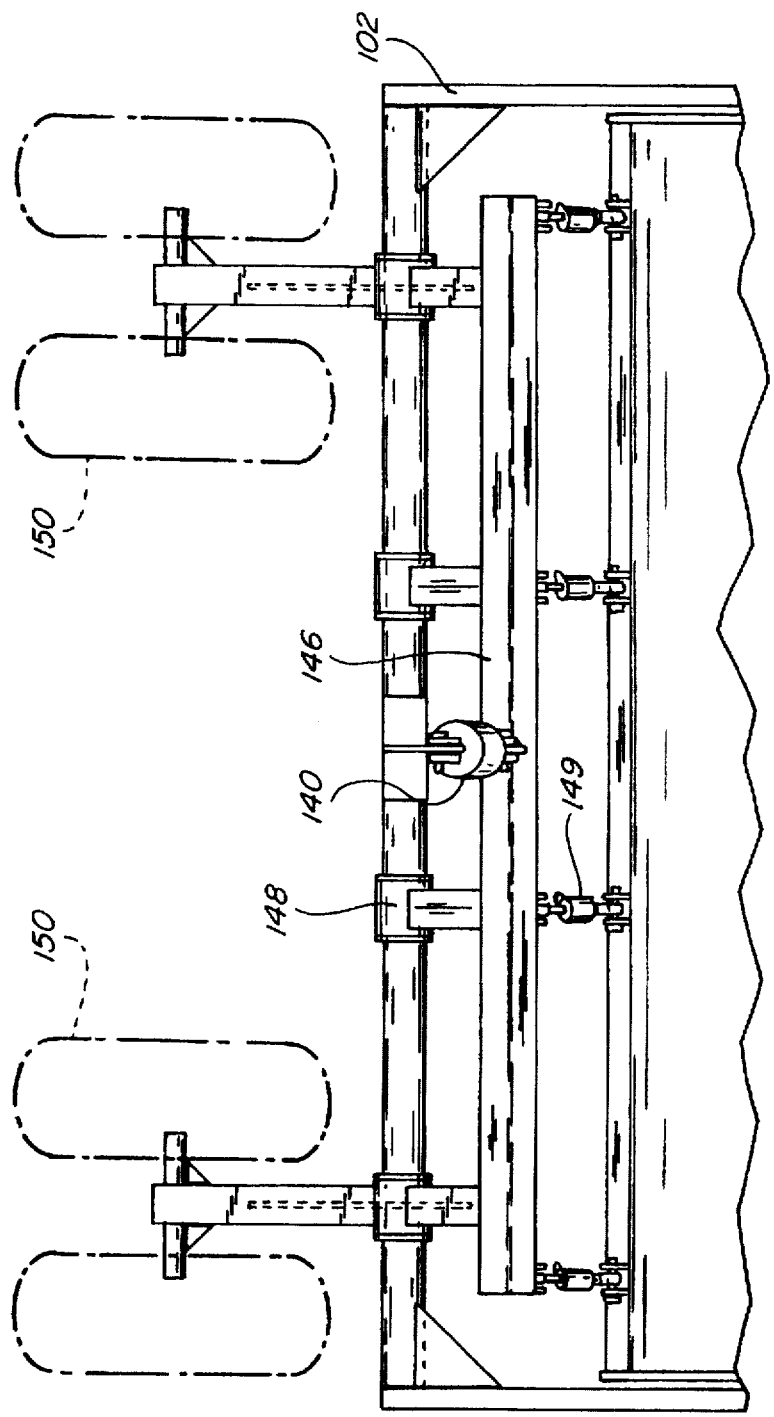
FIG. 5 is a partial top plan view of the rear portion of this invention.

There is also a rear hydraulically activated cylinder shown in FIGS. 3 and 4 connected to the scoop 134 that enables the operator to raise the scoop to prevent it from being damaged while it is towed over rough terrain. To achieve this, the left and right sides of the scoop 134 are beveled, with the shorter edge toward the front and the longer edge toward the back of the device 100. This configuration allows the scoop 134 to pivot about its attachment point 135 without interference from the sides of the scoop with the ground surface. A rear hydraulically activated cylinder 140 is pivotally connected between a vertical framework 142 and a flange 144. The flange 144 is also connected to a rear transverse member 146 positioned between the rear wall of the scoop 134 and the rear edge of the frame 102 as best shown in FIGS. 4 and 5. The rear edge of the frame 102 may have one or more rotatable mounts 148 connected to it for connecting the transverse member 146 on one side and a wheel assembly on the opposite side. The transverse member 146 is also connected to the scoop by means of one or more turnbuckles 149, wherein the lower end of the turnbuckle is pivotally connected to a flange 152 at the lower edge of the scoop 134, and the upper end of the turnbuckle is pivotally connected to the transverse member 146. The turnbuckle is manually adjustable to allow the operator to change the angle of attack of the blade 136.

As the arm of the hydraulically activated cylinder 140 is retracted, the transverse member 146 is raised as it pivots about the rear edge of the frame 102, thereby also raising the lower edge of the scoop 134. This action also causes the wheel assembly to be brought in closer to the frame 102. The configuration of the device with the scoop 134, the transverse member 146, and the wheel assembly 150 in the raised and lowered positions is shown in FIG. 4.

From all that has been said, it will be clear that there has thus been shown and described herein a device for leveling and grading terrain which fulfills the various objects and advantages sought therefor. It will be apparent to those skilled in the art, however, that many changes, modifications, variations, and other uses and applications of the subject device for leveling and grading terrain are possible and contemplated. All changes, modifications, variations, and other uses and applications which do not depart from the spirit and scope of the invention are deemed to be covered by the invention, which is limited only by the claims which follow.

What is claimed is:

1. A dirt leveling device comprising:

a frame having at least a front edge, a rear edge, a left edge, and a right edge;

a transverse shaft rotatably attached to the front edge of the frame;

at least one chisel attached to the transverse shaft;

a scoop rotatably attached at an intermediate position along the left and right edges to said frame, said scoop having a lower edge positionable adjacent the ground surface;

a substantially vertical framework attached adjacent the rear edge of said frame;

a hydraulically actuated cylinder having one end attached to said vertical framework and another end to a land leveling blade, the hydraulically actuated cylinder being adapted to control the depth and rotation of said land leveling blade.

2. The dirt leveling device of claim 1 further including a wheel assembly and a tongue member for towing the device.

3. The dirt leveling device of claim 1 further including a hydraulically actuated cylinder for rotating said transverse shaft.

4. The dirt leveling device of claim 1 wherein said chisels are spaced approximately 9 inches to 12 inches apart on said transverse shaft.

5. The dirt leveling device according to claim 1 wherein a replaceable cutting shoe is attached to one end of said at least one chisel.

6. The dirt leveling device according to claim 1 wherein said at least one chisel is spring loaded to provide individual vertical rotation when an obstruction is hit.

7. The dirt leveling device according to claim 1 wherein a replaceable cutting bar is attached to the lower edge of said land leveling blade.

\* \* \* \* \*